United States Patent
Berndt et al.

(10) Patent No.: US 6,482,515 B1
(45) Date of Patent: Nov. 19, 2002

(54) COLORED LONG-FIBER-REINFORCED POLYOLEFIN STRUCTURE AND SHAPED ARTICLES PRODUCED THEREFROM

(75) Inventors: Heinz Berndt, Heppenheim (DE); Thomas Borgner, Bischofsheim (DE); Joachim Heydweiller, Ruesselsheim (DE); Gabriele Thomas, Dieburg (DE)

(73) Assignee: Ticona GmbH (GB)

( * ) Notice: Subject to any disclaimer, the term of this patent is extended or adjusted under 35 U.S.C. 154(b) by 24 days.

(21) Appl. No.: 09/696,760

(22) Filed: Oct. 26, 2000

(30) Foreign Application Priority Data

Oct. 29, 1999 (DE) ......................... 199 52 461

(51) Int. Cl.⁷ ................................. D02G 3/00
(52) U.S. Cl. .................. 428/392; 428/374; 428/378; 428/383; 428/390
(58) Field of Search .................. 428/364, 374, 428/378, 383, 392, 395

(56) References Cited

U.S. PATENT DOCUMENTS

| 5,079,281 A | * 1/1992 | Takeuchi et al. ............ 523/212 |
| 5,376,701 A | * 12/1994 | Chow et al. ................ 523/213 |
| 5,409,763 A | 4/1995 | Serizawa et al. ........... 428/220 |
| 5,883,186 A | 3/1999 | Gottschalk et al. .......... 525/66 |

FOREIGN PATENT DOCUMENTS

| DE | WO 01/72883 | * 10/2001 |
| EP | 0 315 451 | 10/1989 |
| GB | 2225584 | * 6/1990 |
| JP | 3126740 | 5/1991 |
| JP | 6234896 | 8/1994 |
| JP | WO 97/24399 | * 10/1997 |

* cited by examiner

Primary Examiner—Cynthia H. Kelly
Assistant Examiner—Camie S. Thompson
(74) Attorney, Agent, or Firm—Connolly Bove Lodge & Hutz LLP

(57) ABSTRACT

A colored long-fiber-reinforced polyolefin structure with a length ≧3 mm, which comprises from 0.1 to 90% by weight of at least one polyolefin, from 0.1 to 50% by weight of at least one polyamide, from 0.1 to 15% by weight of at least one modified polyolefin, from 5.0 to 75% by weight of at least one reinforcing fiber, and from 0.1 to 5.0% by weight of at least one dye and/or pigment. The present invention further relates to a process for producing a colored long-fiber-reinforced polyolefin structure, wherein fiber bundles are passed throught a flat die which has been charged with a melt made from polyolefin, polyamide, modified polyolefin and dye and/or pigment, the immersed fiber bundles are passed through a shaping die, the fiber bundles are cooled, and the fiber bundles are cut perpendicular to their running direction to give the length of the structure. The present invention relates to a molded product made from a colored long-fiber-reinforced polyolefin structure and produced by injection molding, extrusion, blow molding or plastic compression molding. The present invention also relates to the use of a colored long-fiber-reinforced polyolefin structure for producing colored moldings for the interior or exterior of motor vehicles.

8 Claims, No Drawings

COLORED LONG-FIBER-REINFORCED POLYOLEFIN STRUCTURE AND SHAPED ARTICLES PRODUCED THEREFROM

BACKGROUND OF THE INVENTION

1. Field of Invention

The present invention relates to a colored long-fiber-reinforced polyolefin structure and to shaped articles produced therefrom and having very good impact strength and high heat resistance (HDT).

2. Description of the Prior Art

Polyolefins, in particular those which comprise polyethylene or polypropylene, are low-cost, low-density thermoplastics which melt readily and are resistant to chemicals. These materials therefore have many uses in areas such as general household items and electrical and electronic parts. However, polyolefins usually have low heat resistance (HDT) and modest mechanical properties. These plastics are therefore unsuitable for use in areas which require high heat resistance and high mechanical strength.

It was known that a reinforcing fiber, such as glass fiber, can be mixed with a polyolefin to improve its strength. The fiber-reinforced polyolefin composition obtained was usually one in which a polyolefin was mixed with short reinforcing fibers, followed by extrusion of the mixture. However, a disadvantage of this process is that the fibers break during grinding within the extruder. This process cannot therefore fulfill the requirement for relatively high mechanical strength.

It was also known that a polyolefin can be reinforced with long fibers, utilizing the character of the reinforcing fiber for the polyolefin with which it is to be mixed. One way of obtaining a long-fiber-reinforced polyolefin structure of this type is to unwind a continuous reinforcing fiber and immerse this in an emulsion or solution of a polyolefin, or in a polyolefin melt. The long-fiber-reinforced polyolefin has better mechanical properties than the short-fiber-reinforced polyolefin described above.

In the automotive industry and similar sectors increasingly high impact strength is being demanded, and conventional long-fiber-reinforced polyolefins cannot fulfill this requirement. For further improvement in impact strength it is possible to mix another thermoplastic with very good impact strength with the long-fiber-reinforced polyolefin. However, products with mechanical properties which are useful for practical purposes cannot be obtained simply by mixing the polyolefin with another plastic. The reason for this appears to be the low mutual dispersibility of the plastics. U.S. Pat. No. 5,409,763 discloses a rod- or bar-shaped long-fiber-reinforced polyolefin structure of length at least 3 mm, produced by mixing 100 parts by weight of a plastic component comprising from 99 to 50 parts by weight of a polyolefin and 1 to 50 parts by weight of a polyamide with from 10 to 200 parts by weight of a reinforcing fiber. The reinforcing fiber has the same length as the structure and its arrangement is essentially longitudinal. Another product disclosed in that publication is a product molded from a rod- or bar-shaped long-fiber-reinforced polyolefin structure of this type. The reinforcing fiber has an average fiber length of at least 1 mm when dispersed in the polyamide, and during the process penetration of the polyolefin and the polyamide occurs, thus forming a crosslinked dispersion.

The polyamide used is stronger than the polyolefin and in terms of surface tension it lies between the polyolefin and the reinforcing fiber, such as glass fiber. A rod- or bar-shaped structure is produced by mixing the polyolefin melt with the polyamide melt and immersing the reinforcing fiber into the melt, and molding the rod- or bar-shaped structure. This gives a shaped article with extremely high impact strength. Within this, the polyamide forms a network structure with the reinforcing fibers and at the same time with the polyolefin. This network structure is further improved as the fiber length increases.

SUMMARY OF THE INVENTION

It is known to be preferable to use a modified polyolefin which bears functional groups having high affinity for the polyamide. This increases the affinity between the polyolefin and the polyamide, thus allowing a network structure to be developed more readily. If the proportion of modified polyolefin is below 1% by weight the effect does not arise. If the proportion is above 50% by weight, the viscosity of the composition increases, and this can lead to difficulties in molding.

The polyolefin can be prepared by polymerization of an α-olefin, such as ethylene or propylene, using a suitable catalyst.

A variety of known polyamides may be used as the polyamide. If the proportion of polyamide in the mixture is below 1% no effective improvement in impact strength is achieved. If the proportion exceeds 50%, the problem of dimensional change of the shaped article due to water absorption is exacerbated.

DETAILED DESCRIPTION OF THE INVENTION

If the proportion of reinforcing fiber is below 10 parts by weight, the fiber achieves only a slight reinforcing effect. If the proportion of reinforcing fiber exceeds 200 parts by weight, the rod- or bar-shaped structure becomes more difficult to produce, or capability for processing to give a shaped article is considerably impaired.

Compositions made from polyolefin, polyamide, modified polyolefin and glass fiber are known from the prior art. These compositions are described in JP-A 03126740, JP-A 03124748, GB-A 2225584, JP-A 02107664, JP-A 01087656, JP-A 01066268, JP-A 63305148, JP-B 06018929, JP-A 60104136, JP-B 61026939, JP-A 56030451, JP-A 6322266, JP-A 7053861 and JP-A 6234896, inter alia.

Many applications demand a colored long-fiber-reinforced polyolefin structure. Addition of even small amounts of at least one dye and/or pigment has considerable effects on the mechanical properties of the polyolefin. It is known that pigments in glass-fiber-reinforced plastics cause mechanical damage to the reinforcing fiber and thus considerably impair mechanical properties.

The object of the present invention is to provide a colored long-fiber-reinforced polyolefin structure with very good mechanical properties, good heat resistance and low water absorption, and to provide an environmentally compatible and cost-effective process for producing this structure, and the use of the structure for producing shaped articles.

The object of the present invention is achieved by means of a colored long-fiber-reinforced polyolefin structure of length ≧3 mm, which comprises a) from 0.1 to 90% by weight of at least one polyolefin,
b) from 0.1 to 50% by weight of at least one polyamide,
c) from 0.1 to 15% by weight of at least one modified polyolefin, d) from 5.0 to 75% by weight of at least one reinforcing fiber, and e) from 0.1 to 5.0% by weight of at least one dye and/or pigment.

The present invention is characterized by the use of at least one dye and/or pigment. Unexpectedly and surprisingly, and despite the addition of at least one dye and/or pigment, the resultant colored long-fiber-reinforced polymer mixture has very good mechanical properties, very good heat resistance and low water absorption. Examples of pigments which may be used are titanium dioxide (white pigment), iron oxide, Sachtolit HDS (red pigments), carbon black, Renol black VE (black pigments), Sicotan Yellow 2112 (yellow pigment), and also Cobalt Green 7911 (green pigment). Other pigments which may be used are those described in Saechtling, Kunststoff-Taschenbuch [Plastics Handbook], Hanser Verlag, 27th edition, on pages 764–766, included herein by way of reference. The pigments may also be added as pigment concentrates, such as pigment pastes or masterbatches.

One preferred embodiment of the invention is a colored long-fiber-reinforced polyolefin structure which comprises a) from 4.0 to 70% by weight of at least one polyolefin, b) from 1.0 to 40% by weight of at least one polyamide, c) from 0.8 to 13% by weight of at least one modified polyolefin, d) from 10 to 65% by weight of at least one reinforcing fiber, and e) from 0.15 to 3.0% by weight of at least one dye and/or pigment.

This composition has excellent mechanical properties and heat resistance, and very low water absorption.

One particularly preferred embodiment of the invention is a colored long-fiber-reinforced polyolefin structure which comprises a) from 30 to 58% by weight of at least one polyolefin, b) from 4.0 to 30% by weight of at least one polyamide, c) from 1.5 to 10% by weight of at least one modified polyolefin, d) from 19 to 58% by weight of at least one reinforcing fiber, and e) from 0.2 to 2.5% by weight of at least one dye and/or pigment.

This composition has quite excellent mechanical properties and heat resistance, and very low water absorption.

In further preferred embodiments the colored long-fiber-reinforced polyolefin structure comprises a) from 0.1 to 24% by weight or from 80 to 90% by weight of at least one polyolefin.

b) from 12.5 to 50% by weight of at least one polyamide, c) from 0.1 to 0.5% by weight or from 12.5 to 15% by weight of at least one modified polyolefin, d) from 5 to 16% by weight or from 50 to 75% by weight of at least one reinforcing fiber, e) from 0.1 to 5% by weight of at least one dye and/or pigment.

The respective compositions have excellent mechanical properties and heat resistance as well as very low water absorption.

According to the invention, the polyolefin (a) may be obtained by addition polymerization of an α-olefin, such as ethylene or propylene, using a suitable catalyst. Examples of the polyolefin (a) are homopolymers of high, medium or low density, such as polyethylene, polypropylene, polymethyl-pentene and copolymers of these polymers. The homopolymers and copolymers may be straight-chain or branched. There is no restriction on this branching, as long as the material can be shaped. It is possible to use a mixture made from two or more of these polymers. According to the invention, the preferred polyolefin used is polypropylene.

According to the invention, various polyamides may be used as the polyamide (b). Examples of these are polyamides obtained by polycondensing dicarboxylic acids, such as oxalid acid, adipic acid, suberic acid, sebacic acid, terephthalic acid, isophthalic acid or 1,4-cyclohexanedicarboxylic acid, with a diamine, such as ethylenediamine, pentamethylenediamine, hexamethylenediamine, decamethylenediamine, 1,4-cyclohexylenediamine or m-xylylenediamine, and polyamide compounds obtained by polymerizing cyclic lactams, such as caprolactam or laurolactam, and polyamides obtained by copolymerizing cyclic lactam and a salt of a dicarboxylic acid with a diamine.

Among these, preference is given according to the invention to nylon-6 (polyamide-6), nylon-6,6 (polyamide-66) and copolymers of these. Nylon-6 is particularly preferred according to the invention as polyamide (b). The heat resistance (HDT) of nylons is higher than that of polyolefin (a). Adding nylon-6 increases the HDT and also the impact strength of the mixture.

According to the invention, the modified polyolefin (c) contains at least one of the following groups: carboxyl, carboxylic anhydride, metal carboxylate, carboxylic ester, imino, amino or epoxy. Examples of the modified polyolefin include modified polyolefin copolymers or grafted copolymers prepared by chemically introducing compounds such as those in the following list: maleic anhydride, fumaric anhydride, citric anhydride, N-phenylmaleimide, N-cyclohexylmaleirmide, glycidyl acrylate, glycidyl methacrylate, glycidyl vinylbenzoate, N-[4-(2,3-epoxypropoxy)-3,5-dimethylbenzyl]acrylamide (AXE), alkyl methacrylate and/or derivatives of these into polyolefins, such as polypropylene, polyethylene or ethylene-propylene copolymers, or into polyamide-grafted polyolefins. There is no limit on the degree of polymerization of the modified polyolefin, and it may also be an oligomer. Particularly preferred modified polyolefins are maleic-anhydride-modified polyethylene, maleic-anhydride-modified polypropylene, maleic-anhydride-modified polyethylene-polypropylene copolymer, fumaric-anhydride-modified polyethylene, fumaric-anhydride-modified polypropylene, fumaric-anhydride-modified polyethylene-polypropylene copolymer, glycidyl-methacrylate-modified polyethylene, glycidyl-methacrylate-modified polypropylene, AXE-modified polyethylene, AXE-modified polypropylene, and polyamide-grafted polyolefins.

According to the invention, the reinforcing fiber (d) is not restricted to a particular material. Examples of reinforcing fibers which may be used and have a high melting point (softening point) are glass fiber, carbon fiber, metal fiber and aromatic polyamide fiber. According to the invention, it is preferable to use glass fiber. The glass fibers used are usually bundles with a fiber diameter of from 8 to 25 μm and with a weight of from 500 to 4400 g per 1000 m. The fibers may have been surface-treated in a known manner.

The fiber bundles are obtained by taking a number of fibers and treating these with an aqueous solution or aqueous emulsion of a size system, followed by bundling. It is preferable to use wound-up fiber bundles which have been bundled, dried and wound-up on packages (direct roving). This results in substantially continuous fiber bundles.

Known additives may also be present in the polyolefin structure, for example lubricants, dyes, pigments, antioxidants, heat stabilizers, light stabilizers, reinforcing agents or hydrolysis stabilizers.

According to the invention, it is preferable for the colored long-fiber-reinforced polyolefin structure to be produced by the pultrusion process, wherein I) fiber bundles are passed through a flat die, which has been charged with a melt made from polyolefin (a), polyamide (b), modified polyolefin (c) and dye and/or pigment (e), II) the immersed fiber bundles are passed through a shaping die, III) the fiber bundles are cooled, IV) the fiber bundles are postformed, and V) the fiber bundles are cut perpendicular to their running direction to give the length of the structure, or are wound up in the form of a continuous structure.

The environmentally compatible and cost-effective process of the invention gives a small rod- or bar-shaped structure of a certain length. The small rod- or bar-shaped structure has a length of from 3 to 100 mm, preferably from 4 to 50 mm and particularly preferably from 5 to 15 mm. The small rod- or bar-shaped structure, also termed a pellet, has a diameter of from 1 to 10 mm, preferably from 2 to 8 mm and particularly preferably from 3 to 6 mm.

The invention also provides a process wherein polyolefin (a), polyamide (b) and modified polyolefin (c) are mixed in an extruder, the reinforcing fiber (d) is wetted by the melt and the material obtained is then pelletized. The resultant pellet may be mixed with dye and/or pigment and further processed to give a colored component.

According to the invention, a molded article is molded from the molten, colored long-fiber-reinforced polyolefin pellets in a manner known per se, such as injection molding, extrusion, blow molding or plastic compression molding.

According to the invention, the colored long-fiber-reinforced polyolefin structure has the shape of a rod or a bar, a strip, a ribbon or a sheet. The shape is preferably that of a rod or bar, obtained by arranging the surface of the fiber. and therefore of the bundle composed of fiber, continuously parallel with a thermoplastic, to give a strand, and then cutting to the necessary length.

According to the invention, the components, except the reinforcing fiber, may be mixed in the melt in a kneader or extruder. The temperature set is from 5 to 100° K., preferably from 10 to 60° K., above the melting point of the higher-melting polymer. The mixing of the melts ends after a period of from 30 seconds to 15 minutes, preferably from 1 to 10 minutes.

According to the invention, the colored long-fiber-reinforced polyolefin structure is used to produce colored moldings. The colored moldings produced from the colored long-fiber-reinforced polyolefin structure of the invention have excellent mechanical properties, in particular excellent impact strength, high heat resistance, and low warpage due to water absorption. The resultant coloration features good uniformity and no color deviation.

According to the invention, the colored long-fiber-reinforced polyolefin structure is used to produce colored moldings subjected to high mechanical or thermal stresses, for example moldings for motor vehicle construction.

The examples below give further illustration of the invention.

EXAMPLES

The colored long-fiber-reinforced polyolefin structures studied were produced by the pultrusion process. For this, a series of glass fiber bundles (E glass, 2400 tex direct roving) was unwound continuously, heated and then passed through a melting die. The melting die had been charged with a melt made from a polypropylene (MFR 230/216 g per 10 min =48, measured to ISO 1133), nylon-6 (VN=143 ml/g, measured in $H_2SO_4$), maleic-anhydride-grafted polypropylene (Polybond® 3200, Uniroyal Chemical) and color masterbatch (gray, essentially composed of 30% by weight of gray, white or black pigments and 70% by weight of carrier material). The constituents of the melt were melted in advance in an extruder in the weight ratio given in Table 1. The courses of glass fiber bundles were immersed into the molten plastic in the melting die. The proportion of glass fiber bundles in this step was set at 40% by weight, by controlling the take-off rate of the glass fiber bundles and the feed quantities of molten polypropylene. Once the courses (strands) of glass fibers comprising polypropylene had been conducted out of the melting die, they were passed through a shaping die and a shaping roll, and cooled. The strands were then cut using an extrudate pelletizer to give a small rod- or bar-shaped structure of length 10 mm.

The resultant pellets were injection molded to give the test specimens described below. Impact strength and other mechanical properties were measured as follows. Elongation at break and tensile modulus of elasticity (secant betw. 0.05% and 0.25% elongation) on ISO B standard specimen, to ISO 527, Charpy AcU impact strength on ISO A standard specimen, to ISO 179, Flexural strength and flexural modulus of elasticity on ISO A standard specimen, in the DIN 53 453 three-point flexural test. The test results are given in Table 2.

Comparative Examples

Comparative Example 1 was a composition without polyamide. Comparative Example 2 was a composition without pigment. The constituents of the compositions are given in Table 1 and the values found are given in Table 2.

TABLE 1

| Constituents | Examples | | Comparative Examples | |
|---|---|---|---|---|
| | 1 % by weight | 2 % by weight | 1 % by weight | 2 % by weight |
| Polypropylene | 47.48 | 37.88 | 57.52 | 58.10 |
| Polyamide | 4.90 | 14.60 | 0.00 | 0.60 |
| Modified polypropylene | 7.30 | 7.30 | 2.16 | 1.30 |
| Glass fiber | 40.00 | 40.00 | 40.00 | 40.00 |
| Pigment | 0.32 | 0.32 | 0.32 | 0.00 |

TABLE 2

| Mechanical properties | Units | Examples | | Comparative Examples | |
|---|---|---|---|---|---|
| | | 1 | 2 | 1 | 2 |
| Tensile modulus of elasticity | [G Pa] | 8.00 | 8.60 | 7.90 | 7.50 |
| AcU | [kJ/m$^2$] | 68.00 | 70.00 | 59.00 | 69.00 |
| Elongation at break | [%] | 2.70 | 2.60 | 2.20 | 2.40 |
| Flexural strength | [M Pa] | 161.00 | 190.00 | 152.00 | 161.00 |
| Flexural modulus | [G Pa] | 8.60 | 9.50 | 7.80 | 7.90 |

Comparing Examples 1 and 2 with Comparative Example 2 shows that on each occasion the mechanical properties found were very similar although they would have been expected to be impaired by the pigment content. The small increase in the polyamide content from 0% by weight to the range from 4.0 to 20% by weight, in particular to 4.90% by weight and 14.60% by weight, brings about an improvement in mechanical properties which was not to be expected and is surprising. Comparing Examples 1 and 2 with Comparative Example 1 shows that the composition with pigment content 15 but without polyamide has very disadvantageous mechanical properties. Comparing Comparative Example 1 with Comparative Example 2 shows that adding small amounts of pigment leads to a marked fall-off in impact strength (AcU). This effect can be clearly demonstrated even though Comparative Example 2 has a very low polyamide content.

What is claimed is:

1. A colored long-fiber-reinforced polyolefin structure which comprises
    a) from 30 to 58% by weight of at least one polyolefin,
    b) from 4.0 to 30% by weight of at least one polyamide,
    c) from 1.5 to 10% by weight of at least one modified polyolefin,
    d) from 19 to 58% by weight of at least one reinforcing fiber,
    e) from 0.2 to 2.5% by weight of at least one dye and/or pigment.

2. The colored long-fibre-reinforced polyolefin structure as claimed in claim 1, wherein the modified polyolefm (c) contains from 1 to 50% by weight, based on the total amount of (a) and (c), of at least one of the following groups: carboxyl, carboxylic anhydride, metal carboxylate, carboxylic ester, imino, amino or epoxy.

3. The colored long-fiber-reinforced polyolefin structure as claimed in claim 1, wherein the polyolefin (a) is polypropylene.

4. The colored long-fiber-reinforced polyolefin structure as claimed in claim 1, wherein the polyamide (b) is nylon-6.

5. The colored long-fiber-reinforced polyolefin structure as claimed in claim 1, wherein the reinforcing fiber (d) is glass fiber.

6. The colored long-fiber-reinforced polyolefin structure as claimed in claim 1, which has a length of from 3 to 100 mm.

7. A molded product which comprises making the product with the colored long-fiber-reinforced polyolefin structure as claimed in claim 1, by the process of injection molding, extrusion, blow molding or plastic compression molding.

8. A colored long-fiber-reinforced polyolefin structure which comprises
    a) from 0.1 to 24% by weight or from 80 to 90% by weight of at least one polyolefin,
    b) from 12.5 to 50% by weight of at least one polyamide,
    c) from 0.1 to 0.5% by weight or from 12.5 to 15% by weight of at least one modified polyolefin,
    d) from 5 to 16% by weight or from 50 to 75% by weight of at least one reinforcing fiber,
    e) from 0.1 to 2.5% by weight of at least one dye or pigment.

* * * * *